(12) United States Patent
Wang et al.

(10) Patent No.: US 8,526,522 B2
(45) Date of Patent: *Sep. 3, 2013

(54) SINGLE CARRIER HIGH RATE WIRELESS SYSTEM

(75) Inventors: Zhaocheng Wang, Stuttgart (DE); Masahiro Uno, Bunkyo-ku (JP)

(73) Assignee: Sony Deutschland GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/238,961

(22) Filed: Sep. 21, 2011

(65) Prior Publication Data

US 2012/0008709 A1    Jan. 12, 2012

Related U.S. Application Data

(63) Continuation of application No. 12/045,342, filed on Mar. 10, 2008, now Pat. No. 8,050,339.

(30) Foreign Application Priority Data

Mar. 30, 2007   (EP) .................................. 07006738

(51) Int. Cl.
*H04L 27/28* (2006.01)

(52) U.S. Cl.
USPC ........................................................ 375/260

(58) Field of Classification Search
USPC .................. 375/260; 370/208, 281, 344
See application file for complete search history.

(56) References Cited

U.S. PATENT DOCUMENTS

| | | |
|---|---|---|
| 6,396,866 B1 | 5/2002 | Upton et al. |
| 6,704,344 B1 | 3/2004 | Hu et al. |
| 7,072,289 B1 | 7/2006 | Yang et al. |
| 2004/0013084 A1 | 1/2004 | Thomas et al. |
| 2004/0151142 A1 | 8/2004 | Li et al. |
| 2005/0122947 A1 | 6/2005 | Wang et al. |
| 2006/0018250 A1 | 1/2006 | Gu et al. |
| 2008/0025424 A1* | 1/2008 | Yang et al. ............. 375/260 |
| 2008/0089282 A1* | 4/2008 | Malladi et al. ......... 370/329 |
| 2009/0225741 A1 | 9/2009 | Wang et al. |
| 2009/0252241 A1* | 10/2009 | Larsson et al. ........ 375/260 |

FOREIGN PATENT DOCUMENTS

| | | |
|---|---|---|
| EP | 0 730 357 A2 | 9/1996 |
| EP | 1 067 709 A1 | 1/2001 |
| EP | 1 139 621 A2 | 10/2001 |
| EP | 1 202 509 A2 | 5/2002 |
| KR | 10-2004-035287 | 4/2004 |
| WO | WO 2004/021657 A2 | 3/2004 |
| WO | WO 2006/075210 A2 | 7/2006 |

OTHER PUBLICATIONS

Nevio Benvenuto, et al., "On the Comparison Between OFDM and Single Carrier Modulation With a DFE Using a Frequency-Domain Feedforward Filter", IEEE Transactions on Communications, vol. 50, No. 6, Jun. 2002, pp. 947-955.

(Continued)

*Primary Examiner* — Don N Vo
(74) *Attorney, Agent, or Firm* — Oblon, Spivak, McClelland, Maier & Neustadt, L.L.P.

(57) ABSTRACT

A signal generator and signal processor for single carrier wireless communication systems with frequency domain equalizer operable to use pseudorandom-noise sequences for cyclic prefix, the pseudorandom-noise sequences for coarse timing synchronization, channel estimation, carrier synchronization, signal-noise-ration estimation and channel equalization.

42 Claims, 7 Drawing Sheets

(56) References Cited

OTHER PUBLICATIONS

David Falconer, et al., "Frequency Domain Equalization for Single-Carrier Broadband Wireless Systems", IEEE Communications Magazine, Apr. 2002, pp. 58-66.

Andreas Czylwik, "Low Overhead Pilot-Aided Synchronization for Single Carrier Modulation With Frequency Domain Equalization", IEEE GLOBECOM, vol. 4, 1998, pp. 2068-2073.

Andreas Czylwik, "Synchronization for Single Carrier Modulation with Frequency Domain Equalization", IEEE VTC, vol. 3, 1998, pp. 2277-2281.

Wei Liu, et al., "Wideband Channel Estimation and Prediction in Single-Carrier Wireless Systems", IEEE VTC, 2005-Spring. vol. 1, 2005, 5 pages.

Bowei Song, et al., "On Channel Estimation and Equalization in TDS-OFDM based Terrestrial HDTV Broadcasting System", IEEE Transactions on Consumer Electronics, vol. 51, No. 3, XP-002514881, Aug. 2005, pp. 790-797.

Extended Search Report issued on Apr. 28, 2011, in corresponding European Patent Application No. EP 11 160 770.1 (10 pages).

* cited by examiner

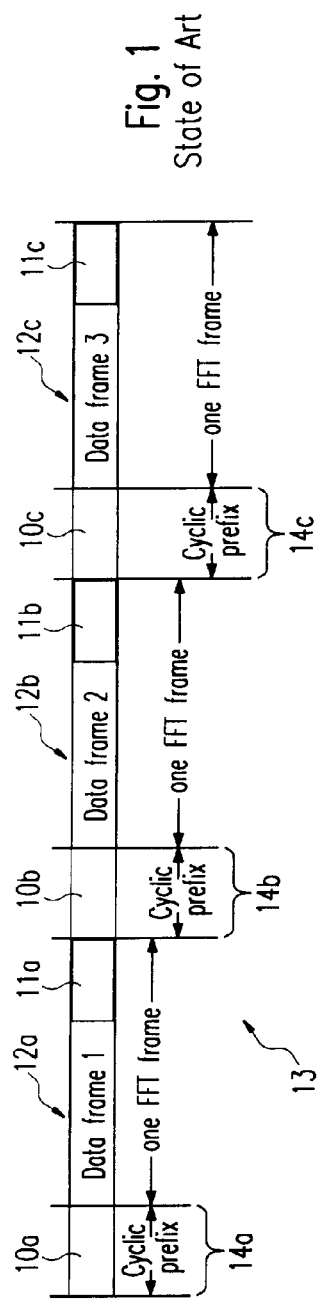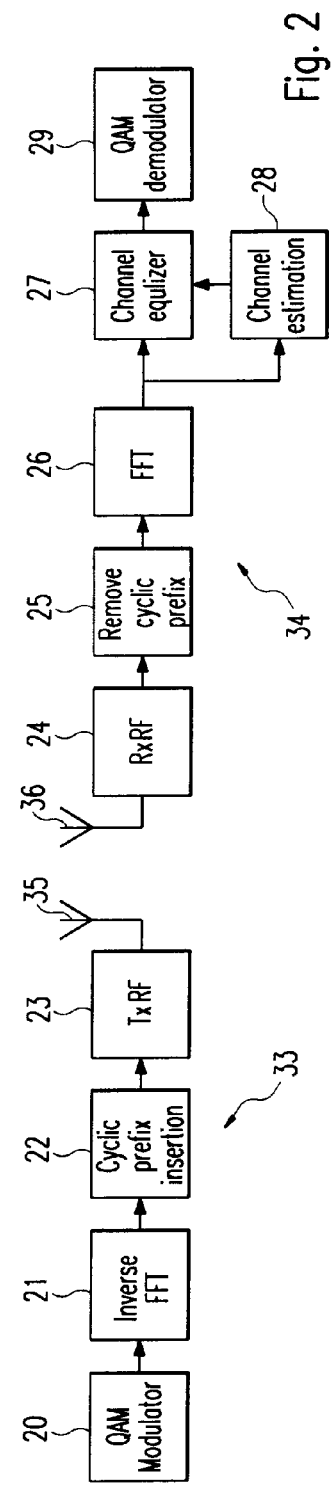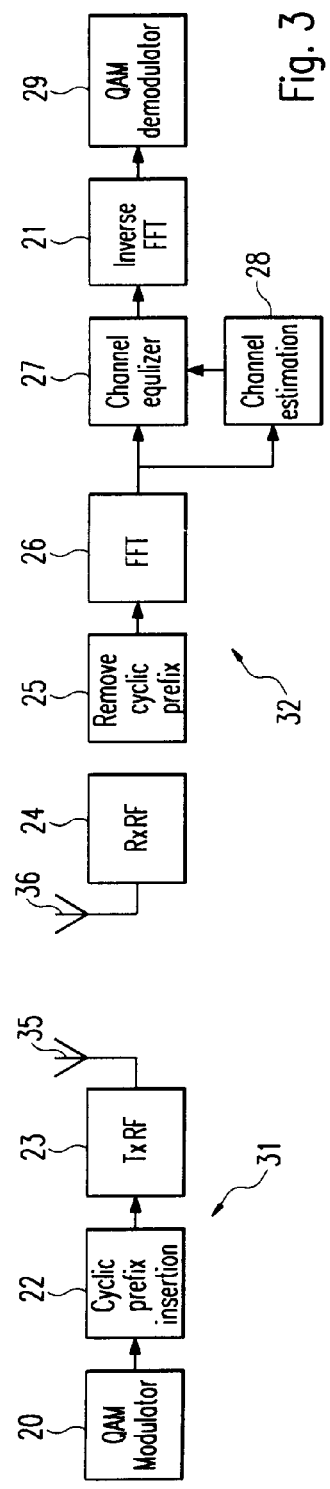

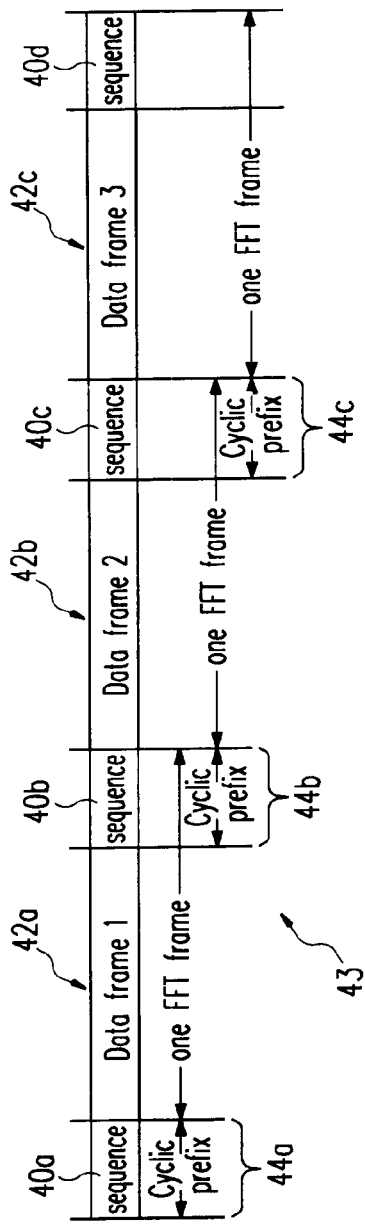
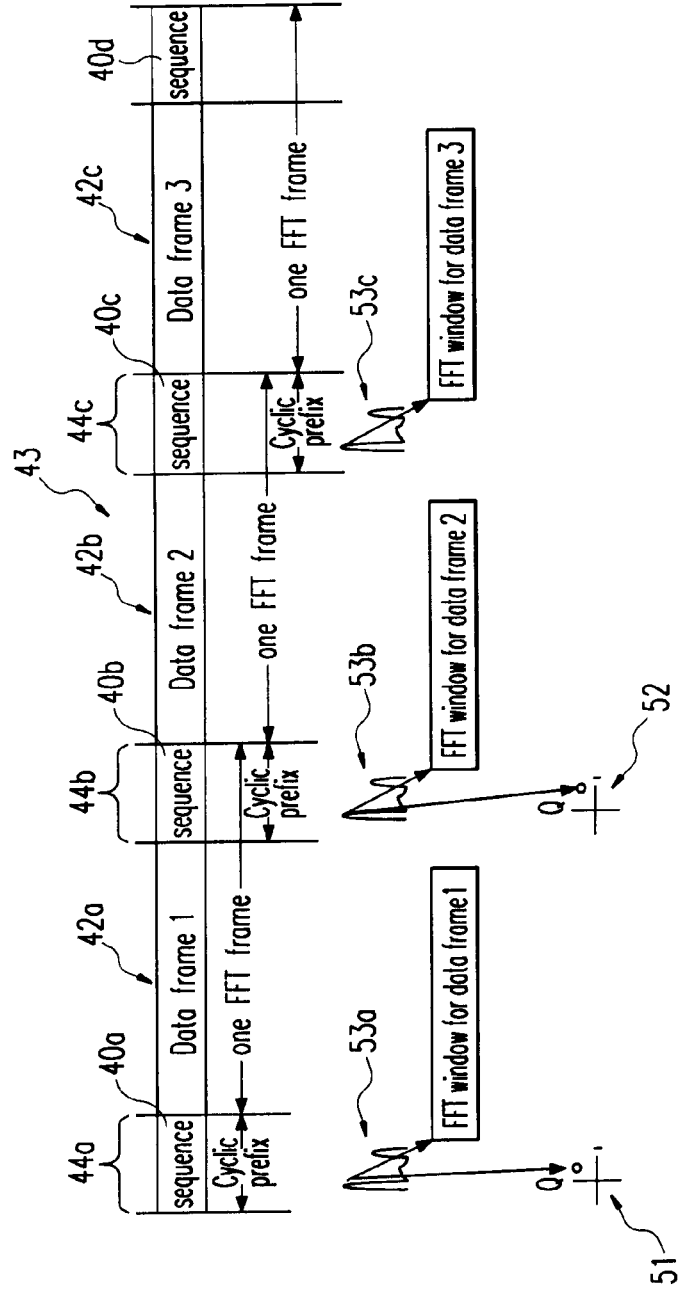

SINGLE CARRIER HIGH RATE WIRELESS
SYSTEM

CROSS-REFERENCE TO RELATED APPLICATIONS

This application is a continuation application of and claims the benefit of priority under 35 U.S.C. §120 from U.S. Pat. No. 8,050,339, filed Mar. 10, 2008, the entire contents of which is incorporated herein by reference. U.S. application Ser. No. 12/045,342 is based upon and claims the benefit of priority under 35 U.S.C. §119 from prior European Patent Application No. 07 006 738.4, filed Mar. 30, 2007.

FIELD OF INVENTION

The present invention relates to the field of single carrier wireless communication, in particular to the management of the time frame structure for the single carrier wireless communication.

PROBLEM

For high rate indoor single carrier wireless systems beyond 1 Gbps, the wireless channel delay spread might be over tens of symbols which makes conventional time-domain channel equalizers including linear, decision feedback or maximum likelihood sequence estimation (MLSE) equalizer unrealistic.

The adaptive equalizer including either linear or decision feedback equalizer is difficult to converge with short training period, because the required number of equalizer taps increases in order to cover the wireless channel delay spread which is over tens of symbols.

The complexity of maximum likelihood sequence estimation (MLSE) or Viterbi equalizer grows exponentially with the number of symbols included in wireless channel delay spread because the required constraint length of Viterbi algorithm increases when wireless channel delay spread is over tens of symbols.

The present invention concentrates on the areas of single carrier wireless systems with frequency domain equalizer and provides means to eliminate the inter-frame interference due to multi-path fading, and simultaneously provides coarse frame timing, carrier synchronization and channel estimation without additional overhead.

STATE OF THE ART

The frame structure of orthogonal frequency division multiplex (OFDM) systems or conventional single carrier systems with frequency domain equalizer can be seen in FIG. 1. The main advantage of OFDM systems, also named as multi-carrier wireless communication systems, is the low complexity frequency domain equalization. In FIG. 2 an example of a block diagram of an OFDM systems is shown.

The conventional single carrier wireless system with frequency domain equalizer uses cyclic prefix for carrier synchronization. Normally the coarse frame timing and channel estimation are realized by introducing the additional pilot frame and the frame adopts constant amplitude zero auto-correlation sequence (CAZAC).

The disadvantages of the state of the art technology for single carrier wireless systems using frequency domain equalizer are as follows:

Additional pilot frame overhead is required for coarse frame timing and channel estimation Carrier synchronization using cyclic prefix is sensitive to channel impulse response

SUMMARY OF THE INVENTION

The present invention relates to a method for generating single carrier wireless communication signal, whereby said communication signal is based on a temporal frame structure, said frame structure comprising a guard interval and a data frame, said method comprising a step of inserting a cyclic prefix into said guard interval, said cyclic prefix comprising at least one pseudorandom-noise sequence.

Favourably, at least two of said pseudorandom-noise sequences are equal to each other.

Favourably, at least two of said pseudorandom-noise sequences are different to each other.

Favourably, said plurality of said pseudorandom-noise sequence is arranged symmetrically within the cyclic prefix.

Favourably, at least two of said pseudorandom-noise sequences are arranged alternatingly within the cyclic prefix.

Favourably, said at least one pseudorandom-noise sequence are consecutively arranged within the cyclic prefix.

Favourably, said cyclic prefix completely fills the guard interval. Favourably, said cyclic prefix is a part of the guard interval.

Favourably, a remaining part of the guard interval is situated before and/or after said cyclic prefix.

Favourably, said remaining part of the guard interval comprises a sequence of zeros. Favourably, at least one of said pseudorandom-noise sequences corresponds to a maximum length sequence.

The present invention also relates to signal generator operable to generate single carrier wireless communication signal, whereby said communication signal is based on a temporal frame structure, said frame structure being operable to provide data management and comprising a guard interval and a data frame, said transmitter comprising a cyclic prefix insertion device operable to insert a cyclic prefix into said guard interval, said cyclic prefix comprising at least one pseudorandom-noise sequence.

Favourably, at least two of said pseudorandom-noise sequences are equal to each other.

Favourably, at least two of said pseudorandom-noise sequences are different to each other.

Favourably, said plurality of said pseudorandom-noise sequence is arranged symmetrically within the cyclic prefix.

Favourably, at least two of said pseudorandom-noise sequences are arranged alternatingly within the cyclic prefix.

Favourably, said at least one pseudorandom-noise sequence are consecutively arranged within the cyclic prefix.

Favourably, said cyclic prefix completely fills the guard interval.

Favourably, said cyclic prefix is a part of the guard interval.

Favourably, a remaining part of the guard interval is situated before and/or after said cyclic prefix.

Favourably, said remaining part of the guard interval comprises a sequence of zeros.

Favourably, at least one of said pseudorandom-noise sequences is a maximum length sequence.

The present invention also relates to a method for processing a received single carrier wireless communication signal, whereby said communication signal is based on a temporal frame structure, said frame structure being operable to provide data management and comprising a guard interval and a data frame, whereby said guard interval comprises a cyclic prefix, said cyclic prefix comprising at least one pseudorandom-noise sequence, said method comprising the steps of correlating at least a part of said at least one pseudorandom-noise sequence of the cyclic prefix with at least one predetermined pseudorandom-noise sequence and outputting a correlation function.

Favourably, said method realizes coarse timing synchronization of said single carrier wireless communication signal based on said at least a part of said at least one pseudorandom noise sequence and/or on said correlation function.

Favourably, said coarse timing synchronization of said single carrier wireless communication signal is based on the autocorrelation peak of said correlation function.

Favourably, said method realizes channel estimation of said single carrier wireless communication signal based on said at least a part of said at least one pseudorandom noise sequence and/or on said correlation function.

Favourably, said method realizes carrier synchronization of said single carrier wireless communication signal based on said at least a part of said at least one pseudorandom noise sequence and/or on said correlation function.

Favourably, said carrier synchronization of said single carrier wireless communication signal is based on the spanned angle of two in-phase/quadrature constellation points of autocorrelation peaks of two consecutive cyclic prefixes.

Favourably, said carrier synchronization of said single carrier wireless communication signal is based on the phase difference rotation between said two constellation points and on the time interval between the autocorrelation peaks of said two pseudorandom-noise sequences of two consecutive cyclic prefixes.

Favourably, said method realizes signal-noise-ratio estimation of said single carrier wireless communication signal is based on said at least a part of said at least one pseudorandom noise sequence and/or on said correlation function.

Favourably, said signal-noise-ratio estimation of said single carrier wireless communication signal is based on the autocorrelation side-lobe of said correlation function, in case the correlation function comprises an auto-correlation side-lobe.

Favourably, said method realizes minimum mean-square error channel equalization of said single carrier wireless communication signal based on said at least a part of said at least one pseudorandom noise sequence and/or on said correlation function.

Favourably, said method comprises steps of applying Discrete Fourier Transformation to a channel transfer function in the time domain of said communication signal and/or of said correlation function and outputting a channel transfer function in the frequency domain, estimating signal-noise-ratio of said channel transfer function and/or of said correlation function, and applying Fast Fourier Transformation to said data frame.

Favourably, said method comprises steps of applying Fast Fourier Transformation to a channel transfer function in the time domain of said communication signal and/or of said correlation function and outputting a channel transfer function in the frequency domain, estimating signal-noise-ratio of said channel transfer function and/or of said correlation function, and applying Fast Fourier Transformation to said data frame.

Favourably, said method comprises a step of realising minimum mean-square error (MMSE) channel equalization by processing said channel transfer function in the frequency domain, said signal-noise-ratio and said Fast Fourier Transformation of said data frame.

The present invention also relates to a signal processor operable to process a received single carrier wireless communication signal, whereby said communication signal is based on a temporal frame structure, said frame structure being operable to provide data management and comprising a guard interval and a data frame, said guard interval comprising a cyclic prefix, said cyclic prefix comprising at least one pseudorandom-noise sequence said receiver comprising a correlation device operable to correlate at least a part of said at least one pseudorandom-noise sequence of the cyclic prefix with at least one predetermined pseudorandom-noise sequence and to output a correlation function.

Favourably, said signal processor is operable to realize coarse timing synchronization of said single carrier wireless communication signal based on said at least a part of said at least one pseudorandom noise sequence and/or on said correlation function.

Favourably, said coarse timing synchronization of said single carrier wireless communication signal is based on the autocorrelation peak of said correlation function.

Favourably, said signal processor is operable to realize channel estimation of said single carrier wireless communication signal based on said at least a part of said at least one pseudorandom noise sequence and/or correlation function.

Favourably, said signal processor is operable to realize carrier synchronization of said single carrier wireless communication signal based on said at least a part of said at least one pseudorandom noise sequence and/or on said correlation function.

Favourably, said carrier synchronization of said single carrier wireless communication signal is based on the spanned angle of two in-phase/quadrature constellation points of autocorrelation peaks of two pseudorandom-noise sequences of two consecutive cyclic prefixes.

Favourably, said carrier synchronization of said single carrier wireless communication signal is based on the phase difference rotation between said two constellation points and on the time interval between the autocorrelation peaks of said two consecutive cyclic prefixes.

Favourably, said signal processor is operable to realize signal-noise-ratio estimation of said single carrier wireless communication signal based on said at least a part of said at least one pseudorandom noise sequence and/or on said correlation function.

Favourably, said signal-noise-ratio estimation of said single carrier wireless communication signal is based on the auto-correlation side-lobe of said correlation function, in case the correlation function comprises an auto-correlation side-lobe.

Favourably, said signal processor is operable to realize minimum mean-square error (MMSE) channel equalization of said single carrier wireless communication signal based on said at least a part of said at least one pseudorandom noise sequence and/or on said correlation function.

Favourably, said signal processor is operable to apply Discrete Fourier Transformation to a channel transfer function in the time domain of said communication signal and/or of said correlation function and to output a channel transfer function in the frequency domain, to estimate signal-noise-ratio of said channel transfer function and/or of said correlation function, and to apply Fast Fourier Transformation to said data frame.

Favourably, said signal processor is operable to apply Fast Fourier Transformation to a channel transfer function in the time domain of said communication signal and/or of said correlation function and to output a channel transfer function in the frequency domain, to estimate signal-noise-ratio of said channel transfer function and/or of said correlation function, and to apply Fast Fourier Transformation to said data frame.

Favourably, said signal processor is operable to realise minimum mean-square error (MMSE) channel equalization by processing said channel transfer function in the frequency domain, said signal-noise-ratio and said Fast Fourier Transformation of said data frame.

DESCRIPTION OF THE DRAWINGS

The features, objects and advantages of the present invention will become more apparent from the detailed description set forth below when taken in conjunction with the drawings, wherein:

FIG. 1 shows an example of a frame structure of OFDM systems or single carrier systems using frequency domain equalizer, FIG. 2 shows an example of a block diagram of OFDM systems, FIG. 3 shows an example of a block diagram of single carrier systems using frequency domain equalizer, FIG. 4 shows an example of a frame structure as an embodiment of the present invention, FIG. 5 shows an example of a frame structure as an embodiment of the present invention and the coarse frame timing and the carrier synchronization based on the auto-correlation peak of PN sequence.

DETAILED DESCRIPTION OF THE INVENTION

This invention describes an application/management example of a frame structure for a single carrier system with frequency domain equalizer, whereby a M (maximum length) sequence 40b or a PN (pseudorandom noise) sequence is used as cyclic prefix in a guard interval 44b. Said frame structure is shown in FIG. 4.

In this invention a M sequence can be exchanged by a PN sequence and vice-versa, when not mentioned otherwise.

The cyclic prefix is able to cope with time dispersive multi-path fading channel, as long as the channel impulse response is shorter than the cyclic prefix. Otherwise there might be inter-frame interference. The introduced overhead is the same as or even less compared to the state of the art like conventional single carrier systems with frequency domain equalizer or OFDM systems.

Beside acting as cyclic prefix to eliminate the inter-frame interference as long as the channel impulse response is shorter than cyclic prefix, a PN sequence as a cyclic prefix is used to facilitate coarse timing, channel estimation and carrier synchronization for single carrier wireless systems using frequency domain equalizer.

The channel estimation accuracy can be improved using a consecutive PN sequence. In the following the basics of a PN sequence and a M sequence, respectively, as well as their characteristics are explained below.

Generally speaking, a signal comprising a message unknown to a receiver has a random nature and is called stochastic signal. In case the signal would not have a random nature, the receiver would be capable to reconstruct the message from the already sent signal due to the deterministic nature of the signal.

Regarding specific definitions, a signal of deterministic character is a signal, which has a value x as a real number for every time t. A signal of stochastic character is a signal, which has a random number y for every time t, whereby said number y can be presented in a probability density function.

Regarding the definition of an auto-correlation function $\phi(\tau)$:

said function is an even function $\phi(\tau)=\phi(-\tau)$ $\phi(\tau=0)$ is the quadratic mean-value and therefore represents the signal power the maximum value of said function is at $\tau=0$ An ideal auto-correlation function is defined as:

$$E\{c_i c_{i+j}\} = \begin{cases} 1 & j = 0 \\ 0 & j \neq 0 \end{cases}$$

Figure 12:
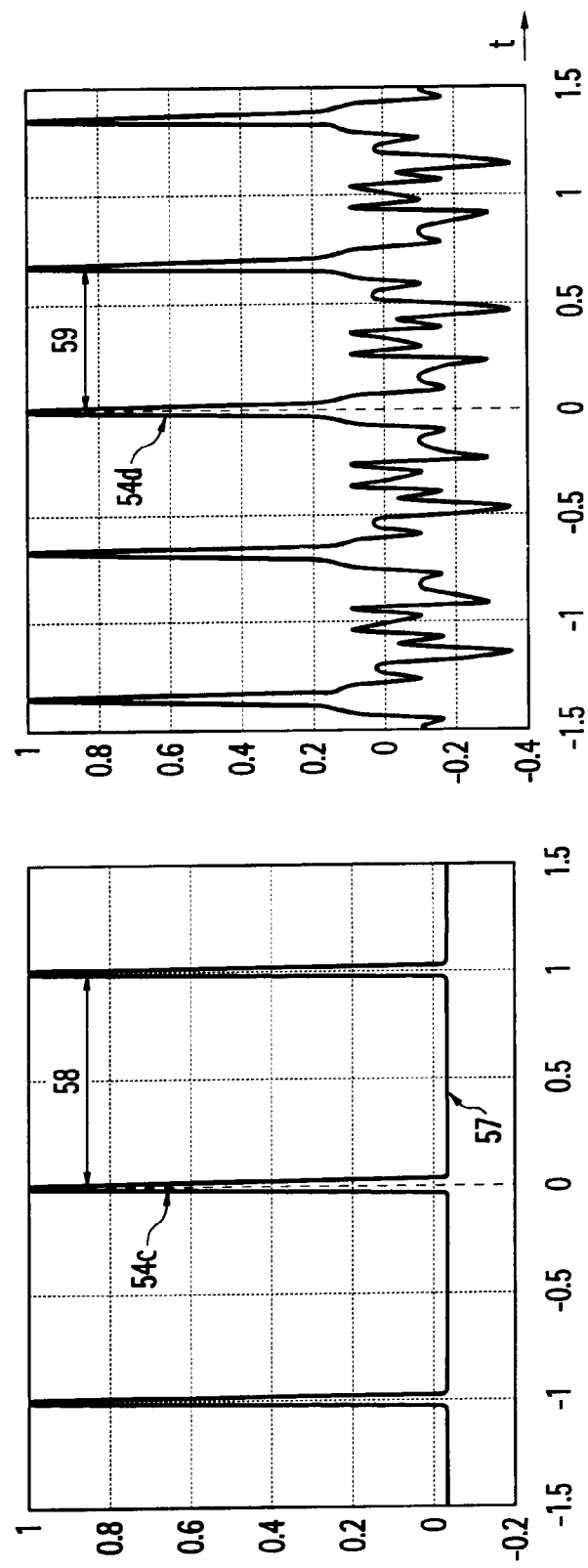
FIG. 12 shows two examples of an auto-correlation graph of a M sequence and a PN sequence.

A non-ideal auto-correlation function comprises several values more, whereby an almost ideal auto-correlation function of periodic consecutive function is presented in FIG. 12 on the left graph and a non-ideal auto-correlation function is presented on the right graph.

A PN sequence is a pseudo-random noise signal, which displays some deterministic features like periodic behaviour. A periodic cycle within the sequence can recur at least once. In case that the periodic cycle is as long as the PN sequence, meaning exactly one period cycle is available, said sequence is also defined as M sequence, standing for "maximum length sequence".

The PN-sequence itself is characterised as follows:
- a PN-sequence comprises binary numbers; for example high value symbols like '1' and low value symbols like '0'
- PN stands for pseudo-random noise; this means that the signal is not completely random but is determinable; eventually the signal has a periodic sequence
- PN-sequences can be realized by a feed-back shift register comprising m stages
- The feed-back shift register comprises at least two feed-backs from any $m^{th}$ stage to the first stage, whereby one feedback is always provided from the $m^{th}$ stage
- PN-sequences might comprise a favourable auto-correlation function
- the auto-correlation function of the PN-sequence has the same period like the respective PN-sequence itself
- The number of high values equals the number of low values plus one
- The low value like '0' cannot appear m-times in succession, thus in case of e.g. m=4 stages no sequence of 4 consecutive '0' is possible The start sequence of said feed-back shift register never comprises a '0' in every stage, whereby in this case no change of the inputted values would occur Periodic cross-correlation function of two orthogonal PN-sequences always equals zero, which is ideal for CDMA (code division multiple access) applications The M-sequence is a special case of PN-sequences and is characterised as follows:

M-sequence has a maximum period length P of a PN-sequence $P=2^m-1$

M-sequence offers outstanding statistical characteristics

M-sequence offers a two-valued periodical auto-correlation function, which is favourable for CDMA $$p(t) = \begin{cases} 1 & \text{for } \tau = nLT_c \text{ with } n = 0, 1, 2, \ldots \\ -\dfrac{1}{2^n - 1} & \text{else} \end{cases}$$

In this case the auto-correlation function of the M-sequence shows the similar behaviour of an ideal auto-correlation function as mentioned above, since only two values are part of said function. The graph is displayed in FIG. 12 on the left side.

Otherwise the periodical cross-correlation function of two M-sequences is not favourable The main advantages of the present invention are that:

a PN sequence with good auto-correlation peak and small auto-correlation side-lobe is used for cyclic prefix. Compared with conventional single carrier wireless system with frequency domain equalization, the overhead introduced by cyclic prefix does not change. Since the PN sequence will be used for coarse frame timing and channel estimation, there is no need for additional pilot frames. The total overhead can be reduced.

reliable carrier synchronization can be achieved using auto-correlation peak of the PN sequence instead of conventional cyclic prefix, which is sensitive to channel impulse response.

reliable coarse timing can be achieved using PN sequence instead of additional pilot frame.

reliable channel estimation can be achieved using the auto-correlation peak of PN sequence.

a MMSE channel equalization can be achieved to improve the performance using the auto-correlation side-lobe information of PN sequence.

the channel estimation accuracy can be further improved using the consecutive PN sequences.

FIG. 1 shows an example of a frame structure of OFDM systems or single carrier systems using frequency domain equalizer.

Also in the following the key principle of OFDM is explained. One key principle of OFDM is that since low symbol rate modulation schemes (i.e. where the symbols are relatively long compared to the channel time characteristics) suffer less from intersymbol interference caused by multipath, it is advantageous to transmit a number of low-rate streams in parallel instead of a single high-rate stream. Since the duration of each symbol is long, it is feasible to insert a guard interval between the OFDM symbols, thus eliminating the intersymbol interference.

The guard-interval also reduces the sensitivity to time synchronization problems.

Although the guard interval only contains redundant data, which means that it reduces the capacity, some OFDM-based systems, such as some of the broadcasting systems, deliberately use a long guard interval in order to allow the transmitters to be spaced farther apart in a single frequency network (SFN), and longer guard intervals allow larger SFN cell-sizes. A rule of thumb for the maximum distance between transmitters in an SFN is equal to the distance a signal travels during the guard interval, for instance, a guard interval of 200 microseconds would allow transmitters to be spaced 60 km apart.

This frame structure 13 of a OFDM system comprises three cyclic prefixes 10a, 10b, 10c and three data frames 12a, 12b, 12c and is shown in the time domain. The basic frame structure comprises one cyclic prefix and one data frame like 10a and 12a and can be chained successively. The cyclic prefixes 10a, 10b, 10c are embedded in the guard intervals 14a, 14b, 14c, respectively. At the chronological end of the respective data frames 12a, 12b, 12c, a respective end 11a, 11b, 11c is designated, said ends 11a, 11b, 11c being part of the respective data frames 12a, 12b, 12c.

In OFDM a data frame is processed by a FFT (Fast Fourier Transformation), whereby the FFT window is as long as the data frame, said FFT window determining the time when said data is being processed by the system and/or the size of the data to be transformed by FFT step by step or at once. In an OFDM symbol the cyclic prefix 10a is a repeat of the end of the symbol 11a which is placed at the beginning of said data frame 12a.

FIG. 2 shows an example of a block diagram of OFDM systems.

Said OFDM system comprises a transmitter 33 and a receiver 34, whereby said transmitter 33 is operable to modulate and transmit electromagnetic waves which are orthogonal frequency division multiplexed, eventually. Said receiver 34 is operable to receive electromagnetic waves and also demodulate said waves which are orthogonal frequency division multiplexed. Said OFDM system is operable to establish a wireless connection and exchange data between its transmitter 33 and receiver 34.

The transmitter 33 comprises a Quadrature amplitude modulation (QAM) modulator 20, an Inverse Fast Fourier Transformation (FFT) module 21, a Cyclic prefix insertion module 22, a Radio frequency transmitter 23 and an antenna 35. The QAM modulator 20 is connected to the Inverse FFT module 21, the Inverse FFT module 21 is connected to the Cyclic prefix insertion module 22, the Cyclic prefix insertion module 22 is connected to the Radio frequency transmitter 23 and the Radio frequency transmitter 23 is connected to the antenna 35.

First an input signal to be modulated and transmitted is sent to the QAM modulator 20.

The QAM modulator 20 is operable to modulate an input signal according to QAM. The Inverse FFT module 21 is operable to apply an inverse FFT transformation on the signal received from the QAM modulator 20. The Cyclic prefix insertion module 22 is operable to insert cyclic prefixes like 10a, 10b, 10c of FIG. 1 into the signal received from the Inverse FFT module 21. The Radio frequency transmitter 23 is operable to convert the signal received from the Cyclic prefix insertion module 22 into a signal which is transmittable by the antenna 35, said antenna 35 being operable to transmit electromagnetic waves carrying data based on said input data.

The receiver 34 comprises an antenna 36, a Radio frequency receiver 24, a Remove cyclic prefix module 25, a FFT module 26, a Channel equalizer 27, a Channel estimation module 28 and a QAM demodulator 29. The antenna 36 is connected to the Radio frequency receiver 24, the Radio frequency receiver 24 is connected to the Remove cyclic prefix module 25, the Remove cyclic prefix module 25 is connected to the FFT module 26, the FFT module 26 is connected to both the Channel equalizer 27 and the Channel estimation module 28, the Channel estimation module 28 is additionally connected to the Channel equalizer 27 and the Channel equalizer 27 is eventually connected to the QAM demodulator 29.

Finally an output signal sent out by the QAM demodulator 29 can now be further processed.

The antenna 36 is operable to receive the signal sent by the antenna 35 and convert said electromagnetic signal into an electric signal. The Radio frequency receiver 24 is operable to receive the electric signal from the antenna 36 and convert said signal into a baseband signal. The Remove cyclic prefix module 25 is operable to receive the signal from the Radio frequency receiver 24 and remove the inserted cyclic prefixes like e.g. 10a, 10b, 10c of FIG. 1 from said signal. The FFT module 26 is operable to transform the signal received from the Remove cyclic prefix module 25 according to a Fast Fourier Transformation. The Channel estimation module 28 is operable to receive the signal from the FFT module 26 and estimate the channel quality and other characteristics based on the channel, said channel corresponding to the wireless connection between the transmitter and the receiver. The channel quality might also describe the background and/or receiver noise. The Channel equalizer 27 is operable to receive one signal sent by the FFT module 26 and one signal sent by the Channel estimation module 28. Then the Channel equalizer 27 compensates for the dynamic frequency response of the wireless channel. The QAM demodulator 29 is operable to demodulate the signal sent by the Channel equalizer 27 and output a demodulated output signal.

FIG. 3 shows an example of a block diagram of single carrier systems using frequency domain equalizer.

Said single carrier system being also an embodiment of the present invention comprises a transmitter 31 and a receiver 32, whereby said transmitter 31 is operable to at least modulate and transmit electromagnetic waves which are modulated onto one single carrier, eventually. Said receiver 32 is operable to at least receive electromagnetic waves and also demodulate said waves which are modulated onto one single carrier. Said single carrier system is operable to establish a wireless connection and exchange data between its transmitter 31 and receiver 32.

Except for the missing Inverse FFT module 21 the transmitter 31 corresponds to the transmitter 33 shown in FIG. 2. Vice-versa the receiver 32 corresponds to the receiver 34 shown in FIG. 2 and additionally comprises an Inverse FFT module 21, the function of said module 21 corresponding to the one described in FIG. 2 and being connected between the Channel equalizer 27 and the QAM demodulator 29 of said receiver 32.

Regarding the receiver 32, the signal from the Remove cyclic prefix module 25 is processed in the FFT module 26 step by step based on the size of the FFT frame. The FFT frame defines the time length, whereby a part of the signal is processed all at once by the FFT module 26.

In another embodiment of the present invention the cyclic prefix insertion module 22 is operable to insert M sequences or PN sequences into the frame structure, which is explained later in detail.

The receiver 32 and the transmitter 31 could be part of one mobile wireless device. Moreover the receiver 32 and the transmitter 31 might be integrated in a semiconductor chip and comprise additional modules operable to extend the operability of the said receiver and/or transmitter, which are not shown in the FIG. 3 for the sake of clarity.

The complexity of single carrier wireless systems with frequency domain equalizer is almost the same as that of OFDM wireless systems.

However, when compared with OFDM systems, the main advantages of single carrier wireless systems with frequency domain equalizer can be summarized as follows The energy of individual symbols is transmitted over the whole available frequency spectrum. Therefore, narrow band notches within the channel transfer function have only small impact on the performance. For OFDM systems, narrow band notches would degrade the performance of transmitted symbols assigned over the relevant sub-carriers. Of course, the diversity can be regained partly by utilizing error control decoder with some performance loss.

Low peak to average ratio for the radiated signal, which makes the power amplifier (PA) from the transmitted side more efficient and cheaper, especially for the millimeter wave wireless systems.

Robust to the effect of phase noise, which makes the local oscillator (LO) simpler, especially for the millimeter wave wireless systems.

The number of analogue-digital-converter (ADC) bits for the receiver side can be reduced, which is critical for high rate communications.

The carrier frequency error between the transmitter side and receiver side can destroy the orthogonality between subcarriers and introduce the inter-subcarrier interference for OFDM systems. However, it has no effect on single carrier systems with frequency domain equalizer.

It is more suitable for the user scenario where the transmitter side would be simple or low power consumption and the receiver side would be complex or relatively high power consumption, like high definition television.

FIG. 4 shows an example of a frame structure as an embodiment of the present invention.

This frame structure 43 being an embodiment of the present invention comprises three cyclic prefixes 40a, 40b, 40c and three data frames 42a, 42b, 42c and is shown in the time domain. Eventually the cyclic prefixes are embedded in guard intervals 44a, 44b, 44c and completely filled in said intervals, said guard intervals 44a, 44b, 44c being the respective time periods before the data frame periods 42a, 42b, 42c.

The cyclic prefix 40a, 40b, 40c comprises at least one PN sequence and is operable to provide data which is necessary for the management of the data frames during the transmission and reception of electro-magnetic waves carrying said data. The cyclic prefix of the present invention can also be part of the data frame as shown in FIG. 1, but is favourably just an add-on in front or behind the adjacent data frame, so that no further redundant data is transmitted.

In FIG. 4, one data frame and one cyclic prefix comprising at least one PN sequence, for example 42a+40b, are processed by a FFT (Fast Fourier Transformation), whereby the FFT window is as long as the length of the data frame 42a plus the length of the cyclic prefix 40b. The frame structure is different from FIG. 1, whereby only data frame is processed by a FFT. Since the cyclic prefix 40a is the same as the cyclic prefix 40b, based on the same principle of OFDM systems, the inter-frame interference introduced by the time disperse multi-path fading channel can be eliminated when the wireless channel delay is less then the length of cyclic prefix.

The cyclic prefix 40a, 40b, 40c also helps the receiver 32 to correctly place the FFT frames and indicates the beginning of the respective data frames 42a, 42b, 42c being processed during a respective FFT frame if one PN sequence is used as

40a, 40b, 40c. The content of the cyclic prefixes 40a, 40b, 40c could be different, similar or equal to each other.

The guard interval 44a, 44b, 44c is operable to provide guard time for propagation delay and to clearly separate the respective data frames 42a, 42b, 42c from each other, so the data of one data frame does not overlap with data of an adjacent data frame in case of multipath propagation during transmission.

The data frame 42a, 42b, 42c is operable to provide data and/or information of any kind which is based on or corresponds to the content of a conversation like e.g. a phone call or other data meant to be transmitted and received by another communication participant. These data might comprise for example emails, pictures and the like. The data frames 42a, 42b, 42c are always of the same size, whereby their data does not necessarily fill out said data frames completely.

The sequence or alternatively said the time flow of the frame structure starts with the first cyclic prefix 40a, continues with adjacent first data frame 42a, then the second cyclic prefix 40b, the second data frame 42b, the third cyclic prefix 40c and ends with the third data frame 42c.

Of course, the frame structure is not limited to these three data frames and three cyclic prefixes, but can go on and form a chain of frames.

A FFT frame, whose operability was already explained in FIG. 1, might be as long as the combination of at least one data frame 42a, 42b, 42c and of at least one cyclic prefix 40a, 40b, 40c. This is different to FIG. 1, wherein one data frame is treated as one FFT frame.

Alternatively the FFT frame might comprise also a part of a preceding cyclic prefix, a complete succeeding data frame and a part of a succeeding cyclic prefix, like for example 40b, 42b and 40c. if for example, several similar PN sequences are concatenated and used as cyclic prefix. This means that the FFT frame can begin somewhere in the first cyclic prefix like 40a, covers the complete data frame 42a and ends somewhere in the succeeding cyclic prefix 40b. As a result, dynamic guard interval length can be achieved.

As an alternative embodiment the FFT frame and/or the time of the FFT frame itself might comprise at least one data frame and one cyclic prefix.

Alternatively the FFT frame might comprise one data frame and the two adjacent cyclic prefixes.

Furthermore, adjacent FFT frames might either be situated side by side or they might overlap with each other. They could partially or completely overlap the area of the cyclic prefix and/or the guard interval, respectively, and/or each other, respectively. When two FFT frames overlap each other, two separate FFT modules might be necessary to independently read and/or process said two FFT frames, respectively.

Figure 8:
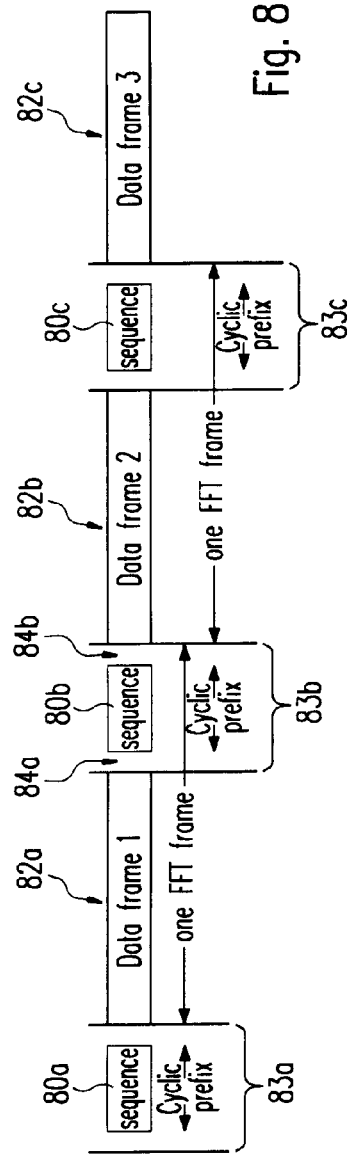
FIG. 8 shows an example of a frame structure with additional guard interval as an alternative embodiment of the present invention.

In case of side by side the border between the two FFT frames might correspond with the border of the data frame and the guard interval or the border of the data frame and the cyclic prefix. Alternatively the border is situated somewhere in the guard interval. In FIG. 8 this embodiment is later explained in more detail.

Regarding the PN sequence, the cyclic prefix might comprise either a single PN sequence or a plurality of identical or different PN sequences, whereby said plurality of PN sequences is formed as a continuous string of sequences. In case of different PN sequences, said continuous string might comprise a random or a deterministic pattern based on how the PN sequences are arranged within the string. One pattern might comprise two different PN sequences which alternate within the cyclic prefix. In another example the cyclic prefix comprises a symmetric arrangement of different PN sequences. These examples are described in more detail in FIG. 13. Depending on the pattern specific characteristics of the cyclic prefix can be read out and matched, respectively, like e.g. location within or speed/carrier synchronization of the cyclic prefix.

The correlation of the cyclic prefix with a predetermined and/or controllable function comprising one or a plurality of identical or different PN sequences is performed in a receiver like 32 of FIG. 3, operable to receive the signal sent from the transmitter 31. The choice regarding the predetermined function and its amount and/or arrangement of PN sequences is dependent on the characteristics of the correlation of the cyclic prefix to be determined.

FIG. 5 shows an example of a frame structure as an embodiment of the present invention and the coarse frame timing and the carrier synchronization based on the auto-correlation peak of PN sequence.

This frame structure 43 corresponds to the frame structure 43 shown in FIG. 4 and comprises four cyclic prefixes 40a, 40b, 40c, 40d and three data frames 42a, 42b, 42c, whereby said cyclic prefixes 40a, 40b, 40c, 40d are or comprises maximum length (M) sequences or pseudorandom noise (PN) sequences. Below each of these PN sequences 40a, 40b, 40c the correlation function of said PN sequences is shown as a graph 53a, 53b, 53c, respectively.

The correlation graphs 53a, 53b, 53c of the PN sequences comprises a high correlation peak and a low auto-correlation side-lobe, respectively, as later shown in FIG. 11. This auto-correlation function is created in a receiver, when the signal with the frame structure comprising the PN sequence is received and correlated with an identical PN sequence.

In case the received cyclic prefix 40a comprises a plurality of identical PN sequences formed as a continuous string and is auto-correlated with one identical PN sequence at a receiver, the auto-correlation graph of the PN sequence will comprise a plurality of high correlation peaks and low auto-correlation side-lobes.

In another example the cyclic prefix 40a comprises a plurality of PN sequences formed as a continuous string and is auto-correlated with one PN sequence being part of said string, it is possible to locate the exact position within the cyclic prefix, when the high correlation peak appears in the graph.

Instead of one single PN sequence, a correlation sequence of identical or different PN sequences is used for correlating with said received cyclic prefix 40a, whereby said correlation sequence or a plurality of said correlation sequence are part of said received cyclic prefix 40a.

Due to the characteristics of the correlation graphs 53a, 53b, 53c of the PN sequences 40a, 40b, 40c, the PN sequence is used to realize coarse timing, channel estimation carrier synchronization, obtain signal-noise-ratio (SNR) estimation and/or implement minimum mean-square error (MMSE) channel equalization. The MMSE channel equalization is described more in detail in FIG. 6 or 7.

Based on the characteristics of the graphs 53a, 53b, 53c, it is possible to determine the beginning of the FFT frame. The FFT frame might start from the beginning or at the end of the graphs 53a, 53b, 53c. Also the high correlation peak or the low auto-correlation side-lobe might be the starting point of the FFT frame. The FFT frame, which is already explained in FIG. 4, comprises at least the data frame succeeding the respective PN sequence. Alternatively the beginning of the FFT frame is independent from the cyclic prefix and/or the guard interval, but at least comprises the complete succeeding data frame.

In particular the coarse frame timing can be determined by the auto-correlation peak of the graph 53a, 53b, 53c of the PN sequence as shown in FIG. 5.

The carrier synchronization can be implemented based on I/Q constellation rotation of the strongest auto-correlation peak from two nearby PN sequence. Below the correlation graphs 53a and 53b the respective constellation points 51 and 52 are shown in a Cartesian coordinates. The phase difference between these two constellation points and the time period between the two PN sequences 40a and 40b can be used for carrier synchronization. The I/Q constellation rotation is shown in detail in FIG. 10.

The cyclic prefix might comprise at least one pseudorandom-noise sequence, whereby said one pseudorandom-noise sequence is complex value and comprises one I-channel pseudorandom-noise sequence and one Q-channel pseudorandom-noise sequence. In alternative embodiments the I-channel sequence and the Q-channel sequence could either be the same or different to each other.

The channel transfer function can be estimated based on several auto-correlation peaks of the graph 53a, 53b, 53c of the PN sequence, whereby the auto-correlation side-lobe from PN sequence can be used for signal to noise ratio (SNR) calculation. The acquired information can be used for MMSE channel equalization.

Figure 6:
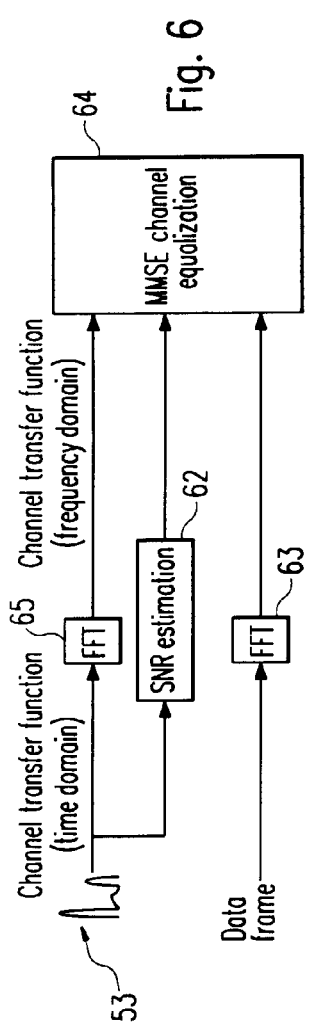
FIG. 6 shows an apparatus for channel equalization being an additional part for an alternative embodiment of the present invention based on Fast Fourier Transformation (FFT)

FIG. 6 shows an apparatus for channel equalization being an additional part for an alternative embodiment of the present invention based on Fast Fourier Transformation (FFT).

This apparatus comprises a FFT module 65, a SNR estimation module 62, a FFT module 63 and a MMSE channel equalization module 64, whereby said apparatus is operable for channel equalization. The channel equalization is mainly used in a receiver like 32 of FIG. 3.

At least a part of said apparatus can be implemented into the receiver 32 of FIG. 3 as channel equalizer 27; in particular the MMSE channel equalizer 64 can be implemented as said equalizer 27.

The FFT module 65 is operable to receive a signal which is a channel transfer function in the time domain, convert said signal into a channel transfer function in the frequency domain and output said signal. The SNR estimation module 62 is operable to receive the same channel transfer function in the time domain, which was received by the FFT module 65 and calculate and/or estimate the signal-noise-ratio of said function. The FFT module 63 is operable to receive a signal comprising the data frame and apply the FFT to said signal. The MMSE channel equalization module 64 is operable to receive the channel transfer function in the frequency domain provided by the FFT module 65, the SNR estimation signal provided by the SNR estimation module 62 and the signal provided by the FFT module 63 and eventually calculate and demodulate the output signal.

It has to be ensured that the channel transfer function 53 comprises the PN sequence with a main high auto-correlation lobe and a smaller auto-correlation side-lobe.

Figure 7:
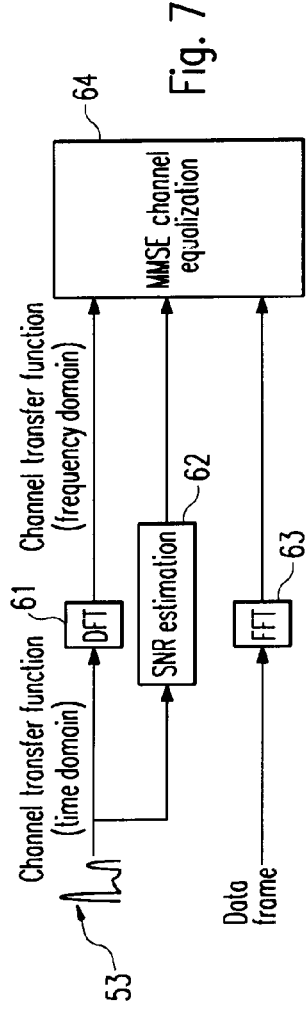
FIG. 7 shows an apparatus for channel equalization being an additional part for an alternative embodiment of the present invention based on Discrete Fourier Transformation (DFT)

FIG. 7 shows an apparatus for channel equalization being an additional part for an alternative embodiment of the present invention based on Discrete Fourier Transformation (DFT).

FIG. 7 shows an apparatus for channel equalization being an additional part for an alternative embodiment of the present invention based on Discrete Fourier Transformation (DFT).

This apparatus comprises a Discrete Fourier Transformation (DFT) module 61, a SNR estimation module 62, a FFT module 63 and a MMSE channel equalization module 64, whereby said apparatus is operable for channel equalization.

Except for the missing FFT module 65 the apparatus of FIG. 7 corresponds to the apparatus of FIG. 6. Both apparatuses can be implemented into the receiver.

Like in FIG. 6, it has to be ensured in FIG. 7 that the channel transfer function 53 comprises the PN sequence with a main high auto-correlation lobe and a smaller auto-correlation side-lobe.

As shown in FIG. 6, FFT can be used instead of DFT to reduce the calculation complexity for obtaining the channel transfer function from frequency domain, which will be adopted for channel equalization.

FIG. 8 shows an example of a frame structure with additional guard interval as an alternative embodiment of the present invention.

This frame structure is based on the frame structure 43 shown in FIG. 4 and comprises three cyclic prefixes 80a, 80b, 80c and three data frames 82a, 82b, 82c, whereby said cyclic prefixes 80a, 80b, 80c are or comprise maximum length (M) sequences or pseudorandom noise (PN) sequences. Between each data frame 82a, 82b, 82c a respective guard interval 83a, 83b, 83c exists. In each of said guard intervals 83a, 83b, 83c a respective PN sequence 80a, 80b, 80c is embedded. Since the guard intervals 83a, 83b, 83c are in this embodiment larger than the PN sequences 80a, 80b, 80c, some free space is left on the right and left side of the PN sequences 80a, 80b, 80c. For example and in detail the first free space 84a is located between the data frame 82a and the PN sequence 80b and the second free space 84b is located between the PN sequence 80b and the data frame 82b.

Thus, the guard interval 83a, 83b, 83c between the PN sequence and the data frame can be extended. If the length of guard interval 83a, 83b, 83c is longer than the wireless channel delay spread, there is no effect on the correlation peak from the data frame part and more accurate channel estimation can be obtained.

The further guard interval between the PN sequence and the data frame, meaning the first and/or second free space 84a and 84b can comprise a sequence of zeros. The two free spaces 84a and 84b might be of different or equal size, respectively.

Figure 9:
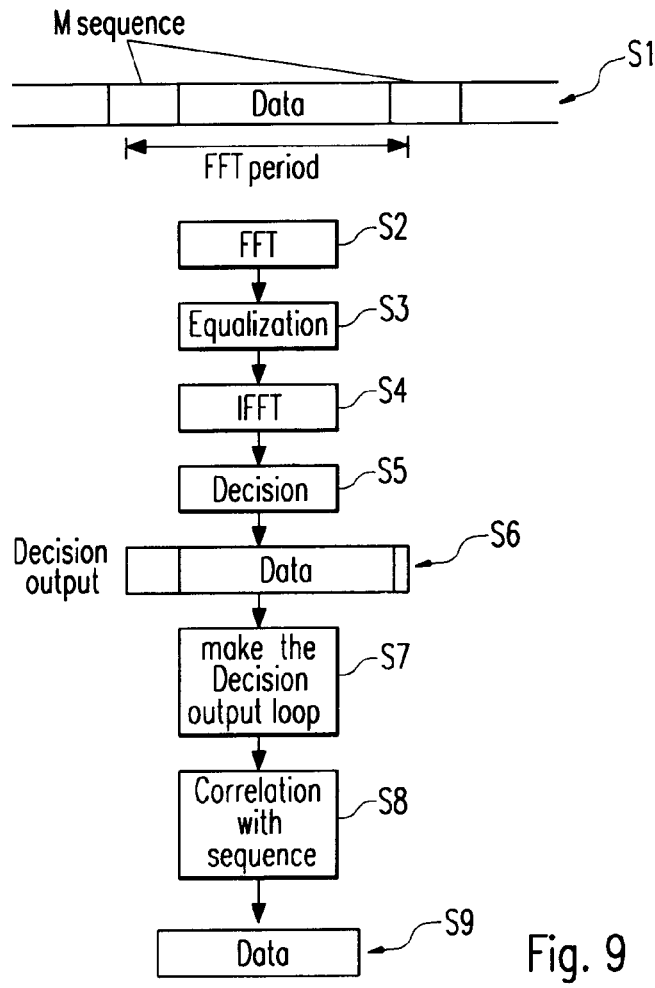
FIG. 9 shows an example of a flow chart comprising a data timing recovery scheme as an alternative embodiment of the present invention.

FIG. 9 shows an example of a flow chart comprising a data timing recovery scheme as an alternative embodiment of the present invention.

In detail the flow chart is a timing offset compensation scheme and comprises nines steps S1 to S9, which is another way of the frequency-domain equalization with cyclic prefixes.

The FFT frame comprises the data frame and the cyclic prefix as explained in FIG. 4 and is read out in step S1. In the next step S2 a FFT is applied to the signal from S1, said signal comprising the FFT frame. In S3 a frequency-domain equalization is conducted to the signal received from step S2. In S4 an Inverse FFT is applied on the signal from S3.

In step S5 a decision is made based on the preceding steps whereby the (hard or soft) decision data is output. After the decision step S5 the data comprising the data frame and a part of the preceding and succeeding cyclic prefix is the result of step S5 and is finally determined and shown in step S6, respectively. After making the decision data output loop in step S7, the correlator searches and eventually determines the border of cyclic prefix and data by applying a PN sequence with said decision output for correlation in step S8 and finally the data part can be derived and shown in step S9.

According to the invention, the timing of FFT frame, meaning the beginning of said FFT frame, does not need to be on the exact place for every FFT frame, but can be placed individually within or on the borders of the cyclic prefix or guard interval as explained above.

In case of high rate mm-wave system, the timing offset change over the data frame becomes comparable with the data symbol length, because of the absolute value of clock offset. By having such idea, the timing offset can be adjusted finally.

Figure 10:
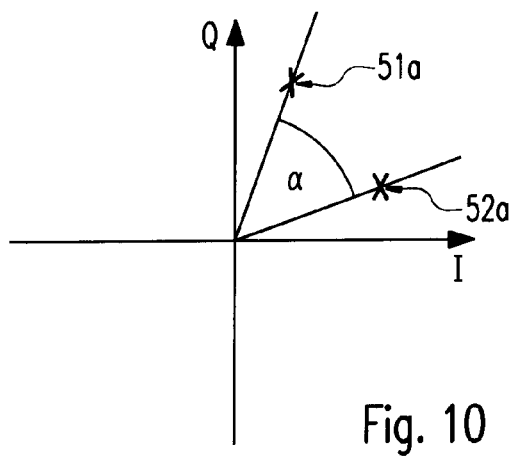
FIG. 10 shows an example of a I/Q constellation rotation of the strongest auto-correlation peak from two nearby PN sequences.

FIG. 10 shows an example of a I/Q constellation rotation of the strongest auto-correlation peak from two nearby PN sequences.

There are two constellation points 51a and 52a of two respective PN sequences shown in a complex plane of a coordinate system, also called constellation diagram. From the view of the origin of the coordinate system the two constellation points 51a and 52a envelop an angle α.

As the symbols are represented as complex numbers, they can be visualized as points on the complex plane. The real and imaginary axes are often called the inphase, or I-axis and the quadrature, or Q-axis. Plotting several symbols in a scatter diagram produces the constellation diagram. The points on a constellation diagram are called constellation points.

The constellation points 51a and 52a are based on the constellation points 51 and 52 shown in FIG. 5.

Figure 11:
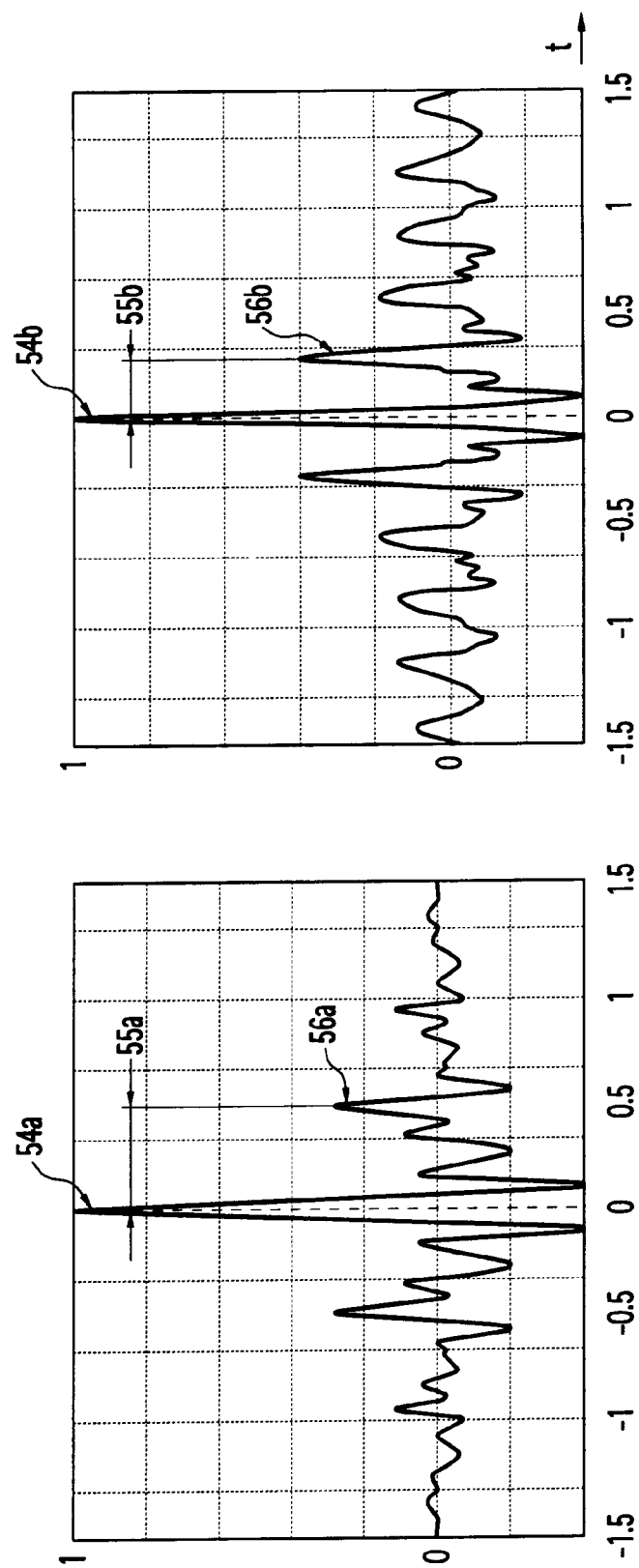
FIG. 11 shows two examples of an auto-correlation graph of two signals.

FIG. 11 shows two examples of an auto-correlation graph of two signals.

The left graph as well as the right graph are auto-correlation graphs, respectively, and are symmetric along the respective axis of the ordinate. Both graphs show the highest peak value at t=0, at the axis of the ordinate. The graphs are shown in a grid system on the x-axis from −1,5 to 1,5 and on the y-axis from −0,4 to 1,0, whereby the vertical lines are spaced apart by 0,25 and the horizontal lines are spaced apart by 0,2. This values are normalized values and are not restricted to these values.

The two signals creating the respective autocorrelation graphs can be PN sequences, whereby the resolution regarding the number of stages of the feed-back shift register is very high.

FIG. 12 shows two examples of an auto-correlation graph of a M sequence and a PN sequence The respective grid systems are based on the grid systems shown in FIG. 11, except for the fact that the vertical lines are spaced apart by 0,5 and the horizontal lines are spaced apart by 0,2. Also both graphs show a symmetry at the axis of the ordinate.

The left graph is the auto-correlation function of a M sequence. This correlation graph displays a periodic function which comprises a high peak value 54c and a lower value 57, and is thus similar to an ideal auto-correlation function of a random signal having only two values. Since the left graph comprises a plurality of identical M sequences, a plurality of identical peaks being spaced apart by a period length 58 of 1 are visible. In the case of M sequences the periodic intervals of the autocorrelation peaks equals the period length of the M sequence.

The right graph is the auto-correlation function of a PN sequence. This correlation graph displays a plurality of periodic peaks of value 1 and a plurality of values around y=−0,2 and 0 between the peaks. Although high peak values 54d are shown and are spaced apart from each other by a periodic interval 59, the values during said periodic interval 59 are not constant like in the left graph during the interval 58.

Figure 13:
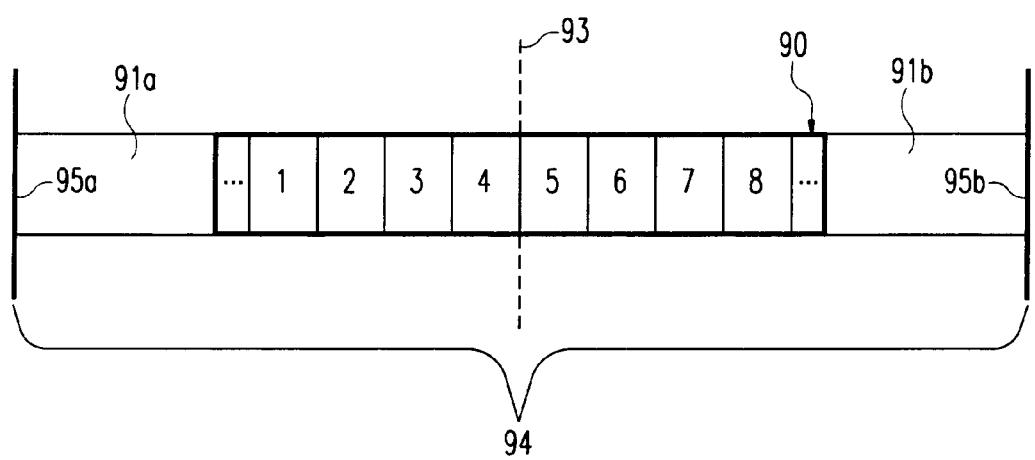
FIG. 13 shows an example of a guard interval and the arrangement of the cyclic prefix as well as of the PN-sequences.

FIG. 13 shows an example of a guard interval and the arrangement of the cyclic prefix as well as of the PN-sequences.

The guard interval 94 comprises a boarder 95a between the preceding data frame and itself as well as a boarder 95b between the succeeding data frame and itself. Moreover the guard interval comprises a cyclic prefix 90 and two free spaces 91a and 91b. The first free space 91a is placed between the first boarder 95a and the cyclic prefix 90 and the second free space 91b is placed between the second boarder 95b and the cyclic prefix 90. The cyclic prefix comprises a symmetric axis 93 and eight PN-sequences 1 to 8 which are arranged consecutively. The unnumbered spaces at the edge and within the cyclic prefix 90 might comprise again a PN-sequence of the same length like e.g. PN-sequence 1.

All components of FIG. 13 correspond to the components described above and already shown in the other Figures.

FIG. 13 is basically describing the arrangement of said components.

In one example the cyclic prefix 90 comprises two different PN-sequences, which are arranged alternatingly, like e.g. one sequence is placed at the even positions 2, 4, 6, 8 and the other sequence is placed at the odd positions 1, 3, 5, 7.

In another example the cyclic prefix comprises different PN-sequences, which are arranged symmetrical. This means e.g. that one sequence is placed at position 4 and 5, the second sequence is placed at position 3 and 6, the next sequence is placed at position 2 and 7, and so on.

In another example the PN-sequences are not limited to be arranged consecutively but could comprise spaces between each other. These spaces might be filled with a sequence of zeros.

Another possiblity in view of the arrangement is considering the position of the cyclic prefix 90 with the guard interval 94.

As shown the guard interval 94 comprises two free spaces 91a and 91b before and after the cyclic prefix.

In another example the cyclic prefix 90 extends till the first boarder 95a and/or the second boarder 95b, so that only one or no free space exists.

In another embodiment at least two of said pseudorandom-noise sequences are equal to each other or at least two of said pseudorandom-noise sequences are different to each other.

Favourably, at least two pseudorandom-noise sequences are arranged symmetrically within the cyclic prefix.

The invention is not limited to the embodiment shown and described above by way of example, but can instead undergo modifications within the scope of the patent claims attached and the inventive concept.

Further embodiments of the invention are possible, but not shown in the drawings for the sake of clarity.

Reference Numbers

| | |
|---|---|
| 1 | First position in cyclic prefix |
| 2 | Second position in cyclic prefix |
| 3 | Third position in cyclic prefix |
| 4 | Fourth position in cyclic prefix |
| 5 | Fifth position in cyclic prefix |
| 6 | Sixth position in cyclic prefix |
| 7 | Seventh position in cyclic prefix |
| 8 | Eight position in cyclic prefix |
| 10a-c | Cyclic prefix |
| 11a-c | End of data frame 1-3 |
| 12a-c | Data frame 1-3 |
| 13 | Frame structure of state of the art |
| 14a-c | Guard intervals |
| 20 | Quadrature amplitude modulation (QAM) modulator |
| 21 | Inverse Fast Fourier Transformation (Inverse FFT) module |
| 22 | Cyclic prefix insertion module |
| 23 | Radio frequency transmitter (Tx RF) |

| | |
|---|---|
| 24 | Radio frequency receiver (Rx RF) |
| 25 | Remove cyclic prefix module |
| 26 | Fast Fourier Transformation (FFT) module |
| 27 | Channel equalizer |
| 28 | Channel estimation module |
| 29 | QAM demodulator |
| 31 | Transmitter of single carrier system |
| 32 | Receiver of single carrier system |
| 33 | Transmitter of OFDM system (orthogonal frequency division multiplex) |
| 34 | Receiver of OFDM system (orthogonal frequency division multiplex) |
| 35 | Antenna of transmitter |
| 36 | Antenna of receiver |
| 40a-d | PN sequence as cyclic prefix |
| 42a-c | Data frame 1-3 |
| 43 | Frame structure comprising an embodiment of the present invention |
| 44a-d | Guard intervals |
| 51 | Constellation point of PN sequence of data frame 1 |
| 51a | First constellation point of PN sequence |
| 52 | Constellation point of PN sequence of data frame 2 |
| 52a | Second constellation point of PN sequence |
| 53 | Channel transfer function (time domain) |
| 53a-c | Correlation function of PN sequence as graph |
| 54a-d | High auto-correlation peak |
| 55a-b | Time interval between main- & side-lobe |
| 56a-b | Low auto-correlation side-lobe |
| 57 | Low auto-correlation value |
| 58 | Time interval between high auto-correlation peaks |
| 59 | Time interval between two main-lobes |
| 61 | Discrete Fourier Transformation module |
| 62 | Signal-Noise-Ratio estimation module |
| 63 | Fast Fourier Transformation module |
| 64 | Minimum mean-square error estimation module |
| 65 | Fast Fourier Transformation module |
| 80a-c | PN sequence as cyclic prefix |
| 82a-c | Data frame 1-3 |
| 83a-c | Guard interval |
| 84a | First free space |
| 84b | Second free space |
| 90 | Cyclic prefix |
| 91a | First free space |
| 91b | Second free space |
| 93 | Symmetric axis of cyclic prefix |
| 94 | Guard interval |
| 95a | Boarder between preceding data frame and guard interval |
| 95b | Boarder between succeeding data frame and guard interval |
| S1 | Step of receiving data stream |
| S2 | Step of Fast Fourier Transformation |
| S3 | Step of equalization |
| S4 | Step of Inverse Fast Fourier Transformation |
| S5 | Step of decision |
| S6 | Decision output |
| S7 | Step of making the decision output loop |
| S8 | Step of correlating with PN sequence |
| S9 | Data output |

The invention claimed is:

1. A method for transmitting a single carrier wireless communication signal, said communication signal comprising a temporal frame structure, said method comprising:
forming frames of said frame structure,
a frame of said frame structure comprising a guard interval and a data frame,
the guard interval comprising at least two binary sequences with characteristics of a maximum length sequence,
at least two of said at least two binary sequences being different than each other, and
a remaining part of said guard interval being situated before and/or after said at least two binary sequences, said remaining part comprising a sequence of zeros; and
transmitting the frames via a transmitter.

2. The method according to claim 1,
wherein said at least two binary sequences are arranged symmetrically within the guard interval.

3. The method according to claim 1,
wherein at least two of said binary sequences are arranged alternatingly within the guard interval.

4. The method according to claim 1,
wherein said at least two binary sequences are consecutively arranged within the guard interval.

5. The method according to claim 1, wherein
at least one of said at least two binary sequences consists of complex values and comprises one I-channel binary sequence and one Q-channel binary sequence, and
the I-channel binary sequence and the Q-channel binary sequence are the same.

6. The method according to claim 1, wherein
at least one of said at least two binary sequences consists of complex values and comprises one I-channel binary sequence and one Q-channel binary sequence, and
the I-channel binary sequence and the Q-channel binary sequence are different than each other.

7. A transmitter unit operable to transmit a single carrier wireless communication signal, said communication signal comprising a temporal frame structure, said transmitter unit comprising:
a frame forming device configured to form frames of said frame structure,
a frame of said frame structure comprising a guard interval and a data frame,
the guard interval comprising at least two binary sequences with characteristics of a maximum length sequence,
at least two of said at least two binary sequences being different than each other, and
a remaining part of said guard interval being situated before and/or after said at least two binary sequences, said remaining part comprising a sequence of zeros; and
a transmitter configured to transmit said frames.

8. The transmitter unit according to claim 7,
wherein said at least two binary sequences are arranged symmetrically within the guard interval.

9. The transmitter unit according to claim 7,
wherein at least two of said binary sequences are arranged alternatingly within the guard interval.

10. The transmitter unit according to claim 7,
wherein said at least two binary sequences are consecutively arranged within the guard interval.

11. The transmitter unit according to claim 7, wherein
at least one of said at least two binary sequences consists of complex values and comprises one I-channel binary sequence and one Q-channel binary sequence, and
the I-channel binary sequence and the Q-channel binary sequence are the same.

12. The transmitter unit according to claim 7,
wherein at least one of said at least two binary sequences consists of complex values and comprises one I-channel binary sequence and one Q-channel binary sequence, wherein the I-channel binary sequence and the Q-channel binary sequence are different than each other.

13. A method for processing a received single carrier wireless communication signal, said communication signal comprising a temporal frame structure, said frame structure being operable to provide data management, said method comprising:
receiving said communication signal comprising said frame structure via a receiver,
a frame of said frame structure comprising a guard interval and a data frame,
the guard interval comprising at least two binary sequences with characteristics of a maximum length sequence, at least two of said at least two binary sequences being different than each other, and a remaining part of said guard interval being situated before and/or after said at least two binary sequences, said remaining part comprising a sequence of zeros;

correlating at least a part of said at least two binary sequences of the guard interval with at least one predetermined binary sequence; and outputting a correlation function.

14. The method according to claim 13, wherein said method realizes coarse timing synchronization of said single carrier wireless communication signal based on said at least a part of at least two binary sequences and/or on said correlation function.

15. The method according to claim 14, wherein said coarse timing synchronization of said single carrier wireless communication signal is based on an autocorrelation peak of said correlation function.

16. The method according to claim 13, wherein said method realizes channel estimation of said single carrier wireless communication signal based on said at least a part of at least two binary sequences and/or on said correlation function.

17. The method according to claim 13, wherein said method realizes carrier synchronization of said single carrier wireless communication signal based on said at least a part of at least two binary sequences and/or on said correlation function.

18. The method according to claim 17, wherein said carrier synchronization of said single carrier wireless communication signal is based on a spanned angle of two in-phase/quadrature constellation points of autocorrelation peaks of two consecutive of said at least two binary sequences.

19. The method according to claim 18, wherein said carrier synchronization of said single carrier wireless communication signal is based on the phase difference rotation between said two in-phase/quadrature constellation points and on a time interval between the autocorrelation peaks of said two ones of said at least two binary sequences.

20. The method according to claim 13, wherein said method realizes signal-noise-ratio estimation of said single carrier wireless communication signal based on at least a part of said at least two binary sequences and/or on said correlation function.

21. The method according to claim 20, wherein said signal-noise-ratio estimation of said single carrier wireless communication signal is based on an autocorrelation side-lobe of said correlation function, in case the correlation function comprises an auto-correlation side-lobe.

22. The method according to claim 13, wherein said method realizes minimum mean-square error channel equalization of said single carrier wireless communication signal based on at least a part of said at least two binary sequences and/or on said correlation function.

23. The method according to claim 22, further comprising:
applying Discrete Fourier Transformation to a channel transfer function in a time domain of said communication signal and/or of said correlation function and outputting a channel transfer function in the frequency domain;

estimating a signal-noise-ratio of said channel transfer function and/or of said correlation function; and applying Fast Fourier Transformation to said data frame.

24. The method according to claim 22, further comprising:
applying Fast Fourier Transformation to a channel transfer function in a time domain of said communication signal and/or of said correlation function and outputting a channel transfer function in the frequency domain;

estimating signal-noise-ratio of said channel transfer function and/or of said correlation function; and applying Fast Fourier Transformation to said data frame.

25. The method according to claim 23 or 24, further comprising:
realizing minimum mean-square error channel equalization by processing said channel transfer function in the frequency domain, said signal-noise-ratio, and said Fast Fourier Transformation of said data frame.

26. The method according to one claim 13, wherein
at least one of said at least two binary sequences consists of complex values and comprises one I-channel binary sequence and one Q-channel binary sequence, and the I-channel binary sequence and the Q-channel binary sequence are the same.

27. The method according to one claim 13, wherein
at least one of said at least two binary sequences consists of complex values and comprises one I-channel binary sequence and one Q-channel binary sequence, and the I-channel binary sequence and the Q-channel binary sequence are different than each other.

28. A receiver unit operable to process a received single carrier wireless communication signal, said communication signal comprising a temporal frame structure, said frame structure being operable to provide data management, said receiver unit comprising:

a receiver configured to receive said communication signal comprising said frame structure, a frame of said frame structure comprising a guard interval and a data frame, the guard interval comprising at least two binary sequences with characteristics of a maximum length sequence, at least two of said at least two binary sequences being different than each other, and a remaining part of said guard interval being situated before and/or after said at least two binary sequences, said remaining part comprising a sequence of zeros; and a correlation device configured to correlate at least a part of said at least two binary sequences of the guard interval with at least one predetermined binary sequence and to output a correlation function.

29. The receiver unit according to claim 28, wherein said correlation device is further configured to realize coarse timing synchronization of said single carrier wireless communication signal based on said at least a part of said at least two binary sequences and/or on said correlation function.

30. The receiver unit according to claim 29, wherein said coarse timing synchronization of said single carrier wireless communication signal is based on an autocorrelation peak of said correlation function.

31. The receiver unit according to claims 28, wherein said correlation device is further configured to realize channel estimation of said single carrier wireless communication signal based on at least a part of said at least two binary sequences and/or correlation function.

32. The receiver unit according to claim 28, wherein said correlation device is further configured to realize carrier synchronization of said single carrier wireless communication signal based on at least a part of said at least two binary sequences and/or on said correlation function.

33. The receiver unit according to claim 32,
wherein said carrier synchronization of said single carrier wireless communication signal is based on a spanned angle of two in-phase/quadrature constellation points of autocorrelation peaks of two binary sequences of two consecutive ones of said at least two binary sequences.

34. The receiver unit according to claim 33,
wherein said carrier synchronization of said single carrier wireless communication signal is based on a phase difference rotation between said two in-phase/quadrature constellation points and on a time interval between the autocorrelation peaks of said two consecutive ones of said at least two binary sequences.

35. The receiver unit according to claim 28,
wherein said correlation device is further configured to realize signal-noise-ratio estimation of said single carrier wireless communication signal based on sat least a part of said at least two binary sequences and/or on said correlation function.

36. The receiver unit according to claim 35,
wherein said signal-noise-ratio estimation of said single carrier wireless communication signal is based on an auto-correlation side-lobe of said correlation function, in case the correlation function comprises an auto-correlation side-lobe.

37. The receiver unit according to claim 28,
wherein said correlation device is further configured to realize minimum mean-square error channel equalization of said single carrier wireless communication signal based on at least a part of said at least two binary sequences and/or on said correlation function.

38. The receiver unit according to claim 37,
wherein said correlation device is further configured:
to apply Discrete Fourier Transformation to a channel transfer function in a time domain of said communication signal and/or of said correlation function and to output a channel transfer function in the frequency domain,
to estimate a signal-noise-ratio of said channel transfer function and/or of said correlation function, and
to apply Fast Fourier Transformation to said data frame.

39. The receiver unit according to claim 37,
wherein said correlation device is further configured:
to apply Fast Fourier Transformation to a channel transfer function in a time domain of said communication signal and/or of said correlation function and to output a channel transfer function in the frequency domain,
to estimate a signal-noise-ratio of said channel transfer function and/or of said correlation function, and
to apply Fast Fourier Transformation to said data frame.

40. The receiver unit according to claim 38 or 39,
wherein said correlation device is further configured to realize minimum mean-square error channel equalization by processing said channel transfer function in the frequency domain, said signal-noise-ratio, and said Fast Fourier Transformation of said data frame.

41. The receiver unit according to claim 28, wherein
at least one of said at least two binary sequences consists of complex values and comprises one I-channel binary sequence and one Q-channel binary sequence, and
the I-channel binary sequence and the Q-channel binary sequence are the same.

42. The receiver unit according to one of the claim 28, wherein
at least one of said at least two binary sequences consists of complex values and comprises one I-channel binary sequence and one Q-channel binary sequence, and
the I-channel binary sequence and the Q-channel binary sequence are different than each other.

* * * * *